United States Patent
Fahrenthold

(10) Patent No.: US 8,682,314 B2
(45) Date of Patent: Mar. 25, 2014

(54) REMOTE VOIP PHONE

(75) Inventor: Kyle W. Fahrenthold, Rowlett, TX (US)

(73) Assignee: Verizon Patent and Licensing Inc., Basking Ridge, NC (US)

( * ) Notice: Subject to any disclaimer, the term of this patent is extended or adjusted under 35 U.S.C. 154(b) by 1461 days.

(21) Appl. No.: 11/605,609

(22) Filed: Nov. 29, 2006

(65) Prior Publication Data

US 2008/0123630 A1    May 29, 2008

(51) Int. Cl.
- H04W 4/00 (2009.01)
- H04L 29/08 (2006.01)
- H04L 12/66 (2006.01)
- H04J 3/16 (2006.01)
- H04B 1/38 (2006.01)

(52) U.S. Cl.
USPC ........ 455/426.2; 370/352; 370/409; 370/466; 455/414.4; 455/557

(58) Field of Classification Search
USPC .......... 370/352, 466, 401, 419, 260; 455/557, 455/414.4, 426.2
See application file for complete search history.

(56) References Cited

U.S. PATENT DOCUMENTS

| | | | |
|---|---|---|---|
| 6,963,757 B1 * | 11/2005 | Watts et al. .................... | 455/557 |
| 7,715,413 B2 * | 5/2010 | Vaziri et al. .................... | 370/401 |
| 2001/0046237 A1 * | 11/2001 | Chan et al. ..................... | 370/419 |
| 2002/0114317 A1 * | 8/2002 | Dorenbosch et al. ......... | 370/352 |
| 2003/0026244 A1 | 2/2003 | Pietrowicz et al. | |
| 2004/0008636 A1 * | 1/2004 | Alexis ........................... | 370/260 |
| 2004/0246990 A1 * | 12/2004 | Krishnamurthi et al. ..... | 370/466 |
| 2005/0064853 A1 * | 3/2005 | Radpour ..................... | 455/414.4 |
| 2005/0107121 A1 * | 5/2005 | Gamble ......................... | 455/557 |
| 2005/0190750 A1 * | 9/2005 | Kafka et al. ................... | 370/352 |
| 2005/0238160 A1 | 10/2005 | Sunstrum | |
| 2006/0040683 A1 | 2/2006 | Lappalainen et al. | |
| 2006/0256774 A1 * | 11/2006 | Rigaldies et al. ............. | 370/352 |

* cited by examiner

*Primary Examiner* — George Eng
*Assistant Examiner* — Jing Gao

(57) ABSTRACT

A first interface includes a packet switched network connector mechanism. A second interface includes a public switched telephone network connector mechanism. A digital signaling mechanism and an analog signaling mechanism accompany the first and second interfaces.

20 Claims, 3 Drawing Sheets

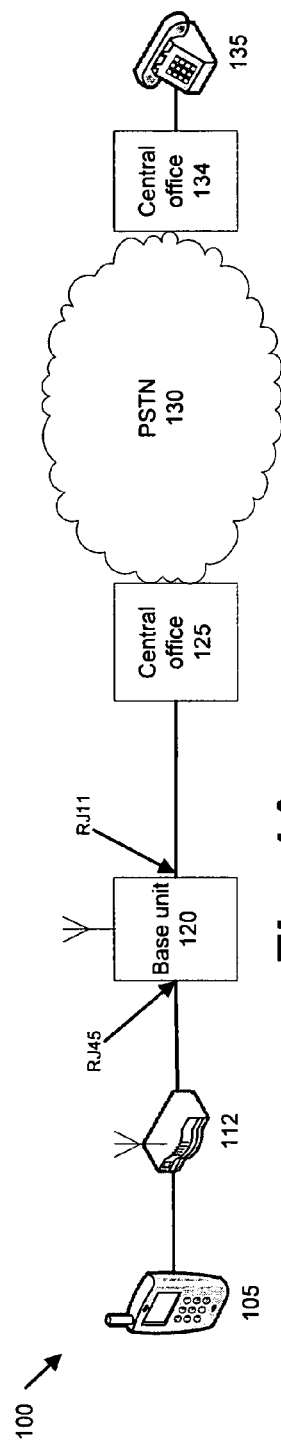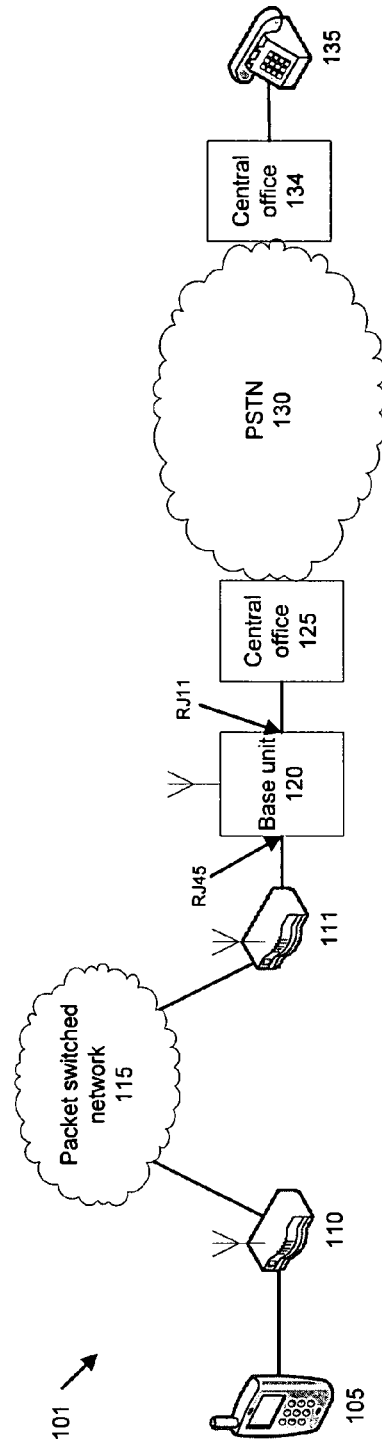

REMOTE VOIP PHONE

BACKGROUND INFORMATION

It has long been known for a telephone customer's premises to be connected to a public switched telephone network (PSTN) via analog lines, e.g., a copper wire loop, etc. A customer premises may be associated with one or more telephone numbers, and one or more telephones may be installed at the customer premises. However, a telephone generally cannot be moved from one customer premises to another, i.e., from one location to another, without becoming associated with a new telephone number, or without associating a telephone number with a new customer premises. Accordingly, at present, telephone customers generally may only make and receive calls using a telephone associated with a telephone number within a particular customer premises, and to avail themselves of services associated with the telephone number, when physically present in the customer premises. This is unfortunate, because it means that a telephone customer is unable to take advantage of subscribed for services when not present within a customer premises, such as a flat rate long-distance plan, a flat rate local calling plan, call forwarding, call waiting, voice mail, etc.

It is also known to transfer voice communications, e.g., Voice over Internet Protocol (VoIP) calls, from a packet switched network to a PSTN. However, the conversion of a call from digital to analog, or vice versa, and the accompanying translation of signaling protocols respectively used for digital and analog calls, generally takes place at a softswitch or gateway between the PSTN and the packet switched network. At present, telephones or other voice communications devices within customer premises may be attached to a packet switched network or a PSTN, but not both. It is presently not possible for a user having a telephone line connected to the PSTN to use this telephone number, and any subscribed-for functionality associated with the telephone number, by accessing a packet switched network. Accordingly, it is not presently possible for a user of a packet switched network to take advantage of the user's line to a PSTN other than by using a telephone or other device plugged into the line, nor is possible for a user subscribing to a PSTN line to take advantage of the portability and flexibility of being able to access the PSTN line from anywhere there is a connection to a packet switched network such as the Internet.

BRIEF DESCRIPTION OF THE DRAWINGS

FIG. 1A illustrates an exemplary system for using a handset to place calls through a telephone base unit over a public switched telephone network (PSTN).

FIG. 1B illustrates an exemplary system for using VoIP handset to place calls through a packet switched network and a telephone base unit over a PSTN.

DETAILED DESCRIPTION OF PREFERRED EMBODIMENTS

Figure 2:
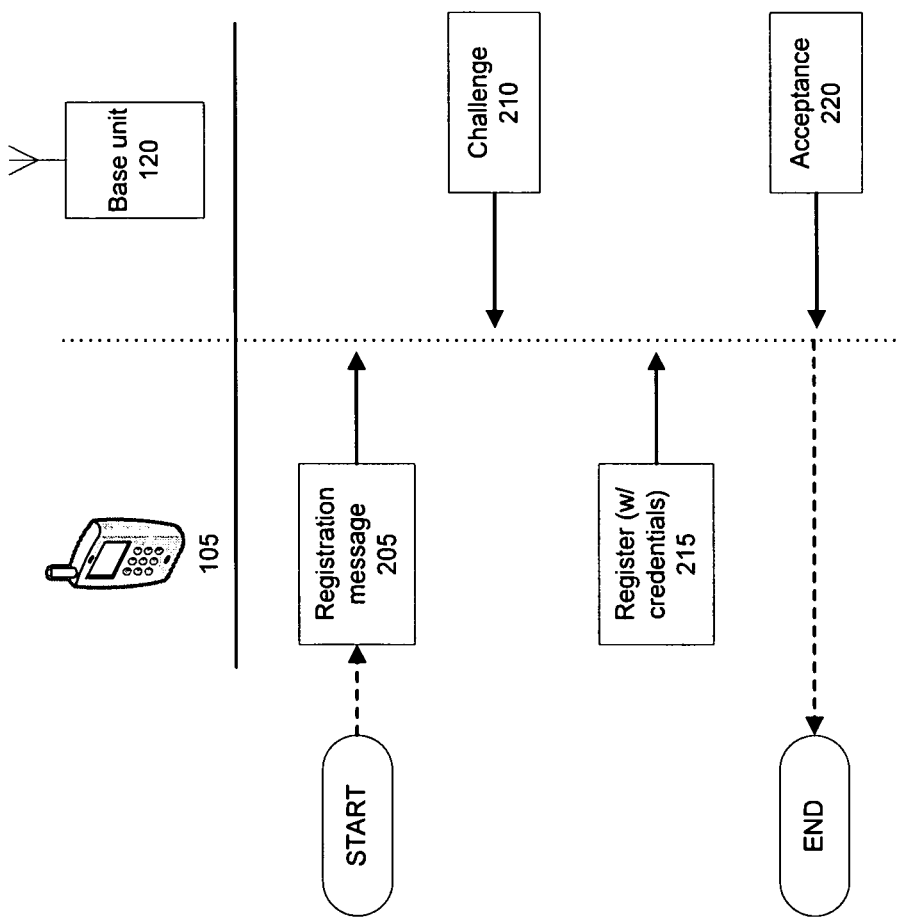
FIG. 2 illustrates an exemplary call flow for registering a handset with a base unit according to Session Initiation Protocol (SIP).

FIG. 1A illustrates an exemplary system 100 for using a handset 105 to place calls through a telephone base unit 120 over a public switched telephone network (PSTN) 130.

Handset 105 is generally a handheld computing device including a processor and a memory that is capable of storing program instructions and of sending and receiving communications with a router 112, e.g., via an Ethernet connection or the like. Such an Ethernet connection may be accomplished through a variety of known mechanisms, such as a Cat5 cable, or a radiofrequency connection according to known protocols such as IEEE 802.11, etc. Handset 105 transmits voice communications to router 112, e.g., according to some known form of Voice over Internet Protocol (VoIP).

Router 112 may be any one of a number of known routers that connect network devices such as handset 105 to other network devices, such as base unit 120.

Base unit 120 also includes a processor and a memory and is also capable of digital communications with router 112 via a variety of known mechanisms such as those described above. It is possible that base unit 120 could be incorporated into a private branch exchange (PBX) or the like, thereby making the functionality of the PBX accessible through the base unit 120.

Base unit 120 advantageously includes signaling connections for, and the capability for making and receiving, both digital and analog calls. Base unit 120 also includes a mechanism that may be hardware and/or software to provide for analog voice signals to digital voice signals and vice versa, and also for converting analog signaling protocols to digital signaling protocols and vice versa. Base unit 120 further generally includes connector mechanisms that allows it to connect to, and communicate with, both to router 112 and central office 125. For example, as illustrated in FIGS. 1A and 1B, base unit 120 may include an interface for an RJ11 jack or the like, as well as an interface for a modular connectors such as an RJ45 jack, a wireless connection to router 112, etc. A public switched telephone network connector mechanism such as an RJ11 jack allows base unit 120 to connect to central office 125 via a conventional wire loop. At the same time, a packet switched network connector mechanism such as RJ45 jack allows base unit 120 to connect to router 112 and/or packet switched network 115 (illustrated in FIG. 1B and discussed below).

In an exemplary embodiment, base unit 120 includes a digital signal processor (DSP). As is known, a DSP may be used to process digital signals, such as digital voice signals, and provide analog output representing the digital signals. Similarly, in an exemplary embodiment, base unit 120 includes an analog-to-digital converter (ADC) such as is known for converting analog signals such as analog audio signals, e.g., voice signals, to a digital representation of the analog signals.

Further, in an exemplary embodiment, base unit 120 includes program instructions for communicating with handset 105 using a signaling protocol such as Session Initiation Protocol (SIP). SIP is well known and is described in J. Rosenberg et al., SIP: Session Initiation Protocol, RFC 3261, published in June 2002 by The Internet Society of Reston, Va. In this embodiment, base unit 120 further includes program instructions for converting SIP messages to analog call signals, and vice versa.

Base unit 120 communicates with a central office 125. Central office 125 is well known for including switches that connect a telephone unit such as base unit 120 with a PSTN 130.

A conventional telephone 135 may be connected to PSTN 130, as is known, e.g., through a central office 134. Accordingly, VoIP handset 105 may place and receive calls to and from telephone 135 through base unit 120 and PSTN 130. Of course, although not illustrated in FIG. 1A or 1B, handset 105 could also place and receive calls to and from other VoIP phones and/or through base unit 120 and PSTN 130, inasmuch as it is known for VoIP phones to access PSTN 130 using softswitches, gateways, and the like. Central offices 125 and 134 are sometimes thought of as being included within PSTN 130.

FIG. 1B illustrates an exemplary system 101 for using VoIP handset 105 to place calls through a packet switched network 115 and a telephone base unit 120 over a PSTN 130. It may be noted that system 101 is described with certain elements in common with system 100 illustrated in FIG. 1A. However, whereas system 100 illustrated in FIG. 1A may be suitable for allowing handset 105 to be used through a local area network (LAN) connection in a customer premises, system 101 illustrated in FIG. 1B may be suitable for allowing handset 105 to be used through a wide area network (WAN) such as the Internet or the like. Accordingly, system 101 may allow a user to use handset 105 to make and receive calls, and access other services, via base unit 120, while at an unlimited number of locations around the world.

In system 101, handset 105 communicates with base unit 120 through packet switched network 115 and routers 110 and 111. Packet switched network 115 may be an Internet protocol (IP) network or the like such as is known for transporting digital data packets. Similar to router 112, routers 110 and 111 may be any one of a number of known routers for routing digital packets, and for connecting network devices to each other and/or to packet switched network 115.

Computing devices such as handset 105, base unit 120, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. While handset 105 generally is a handheld computing device and base unit 120 is generally a desktop unit, it is to be understood that computing devices including handset 105 and base unit 120 may include any one of a number of computing devices known to those skilled in the art, including, without limitation, a computer workstation, a desktop, notebook, laptop, or handheld computer, or some other computing device known to those skilled in the art.

Computing devices such as handset 105, base unit 120, etc. generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

FIG. 2 illustrates an exemplary call flow 200 for registering handset 105 with base unit 120 according to Session Initiation Protocol (SIP). However, other protocols could be used to register handset 105 with base unit 120. It is to be noted that FIG. 2 is in the format of a standard call flow diagram. Messages shown in the column under handset 105 originate in handset 105 and are directed to base unit 120, while messages shown in the column under base unit 120 originate in base unit 120 and are directed to handset 105.

At 205, handset 105 sends a SIP REGISTER message to base unit 120. Handset 105 generally includes in memory a network address, e.g., an Internet protocol (IP) address for base unit 120, to which handset 105 is programmed to send the registration message of block 205.

Next, at 210, base unit 120 responds to the message sent in 205 with a challenge and request for authentication. Authentication in the context of SIP generally involves a known process for the exchange of encrypted keys, which known process is consistent with, and is generally part of, process 200, including blocks 210-_220.

Next, at 215, handset 105 sends a SIP REGISTER message to base unit 120 including authentication credentials.

Then, at 220, base unit 120 responds to the registration message sent in step 215 with a message indicating acceptance of the authentication credentials provided in step 215. Of course, although not illustrated in FIG. 2, it is possible for the authentication attempt of block 215 to fail, in which case call flow 200 is terminated.

In any event, following block_220, call flow 200 ends. However, assuming that the authentication attempt succeeds, handset 105 may proceed to place and receive calls, or access other services available through base unit 120, an example of which is described next with reference to FIG. 3. In some embodiments, handset 105 may send a status message to base unit 120 at predetermined intervals, whereupon base unit 120 requires handset 105 to re-authenticate if a predetermined interval expires without a status message from handset 105.

Figure 3:
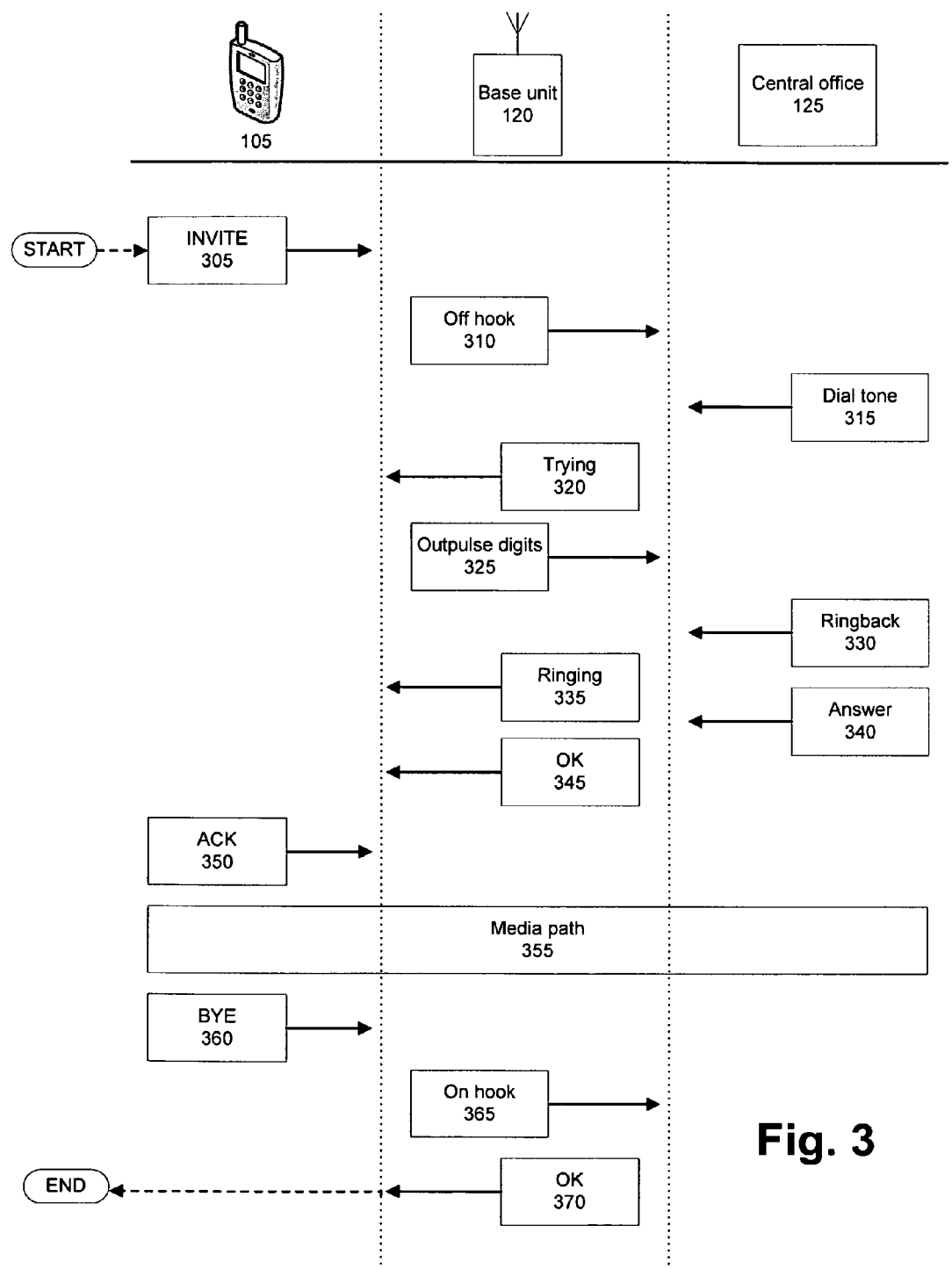
FIG. 3 illustrates an exemplary call flow for placing a call from a handset through a base unit.

FIG. 3 illustrates an exemplary call flow 300 for placing a call from handset 105 through base unit 120. It is to be understood that call flow 200 is generally a prerequisite for call flow 300. As with FIG. 2, it is to be noted that FIG. 3 is in the format of a standard call flow diagram. Messages shown in the column under handset 105 originate in handset 105 and are directed to base unit 120, while messages shown in the column under base unit 120 originate in base unit 120 and are directed to handset 105 or central office 125. Messages shown in the column under central office 125 originate in central office 125 and are directed to base unit 120.

Next, at 305, handset 105 sends a SIP INVITE message to base unit 120. Such a message may be initiated, for example, by a user dialing a telephone number in handset 105, e.g., a number of telephone 135, and pressing a send button or the like to initiate a call.

Next, at 310, program instructions in base unit 120 parse the INVITE message sent in block 305, and cause an "off hook" signal to be sent to central office 125. Such a signal is well-known with respect to conventional analog telephones for indicating that the telephone is ready to dial a call.

In response to the "off hook" signal sent at 310, at 315, central office 125 next sends a dial tone to base unit 120.

Next, at 320, base unit 120 sends a message to handset 105 indicating that base unit 120 is trying to place the call requested by handset 105 at block 305. Program instructions in base unit 120 generally determine that a dial tone has been received as described above with respect to block 315, and then create a SIP "trying" message to be sent to handset 105.

Next, at 325, base unit 120 dials a number requested by handset 105 at block 305 and sends the requested digits to central office 125. Program instructions and base unit 120 may parse a telephone number provided by handset 105 at block 305, and then dial the telephone number by providing to central office 125 a dual-tone multi-frequency (DTMF) signal or set of signals representing the telephone number, e.g., of telephone 135.

Next, at 330, central office 125 sends a "ring back" message to base unit 120, e.g., an audible indication that telephone 135 is ringing.

Next, at 335, base unit 120, according to program instructions for handling a "ring back" message, sends a "ringing" message to handset 105, thereby making it possible for handset 105, e.g., according to program instructions, to indicate to a user that telephone 135 is ringing.

Next, at 340, the call placed at block 305 is answered, at telephone 135, and central office 125 signals a message so indicating to base unit 120.

Next, at 345, base unit 120 sends an "OK" message to handset 105, according to program instructions for handling an answered call.

Next, add 350, handset 105 response to the "OK" message sent in 345 by sending an "ACK" message to base unit 120.

Next, media path 355 represents the transmission of call data, e.g., voice data, between handset 105 and telephone 135. As mentioned above, base unit 120 may include a DSP, and ADC, etc. for converting digital signals to analog and vice-versa.

Next, at 360, the call ends and handset 105 accordingly sends a SIP BYE message to base unit 120.

Next, at 365, according to program instructions for handling a BYE message, base unit 120 signals central office 125 that it is now "on hook."

Next, at 370, base unit 120 sends a SIP OK message to hand said 105.

Call flow 300 ends following block 370.

Call flow 300 is intended to be exemplary, and not limiting. Besides placing a call using handset 105, numerous other calling scenarios are possible by using handset 105 and base unit 120 in systems 100 or 101. Certain examples, also not intended to be limiting, are provided in the following paragraphs.

In one example, when a telephone call is received at base unit 120, e.g., from telephone 135, it is possible, e.g., using SIP, to too send an INVITE message to handset 105, and to establish a call between handset 105 and telephone 135. Moreover, because SIP supports call forwarding, it is further possible that handset 105 could forward calls received via base unit 120 to some other destination.

Further, SIP or some other protocol could be used in handset 105 to access conference calling functionality available through base unit 120. SIP messages for establishing a conference call are known. Base unit 120 could be configured, e.g., could include program instructions, to translate such SIP messages to analog messages that would establish a conference call, e.g., a three-way call over PSTN 130.

Also, SIP includes the ability to set a "do not disturb" state. Accordingly, handset 105 may send a message indicating a do not disturb state to base unit 120, which may then send an "off hook" message upon receiving a call or may forward calls to voicemail.

Again, the foregoing scenarios are exemplary, and it is to be understood that possible embodiments include virtually any scenario in which a digital signaling protocols such as SIP may be converted to analog signals, and vice versa.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a telephone base unit connected to an interface between a first customer premises and a circuit switched network, the telephone base unit being to:
   receive, via a packet switched network and according to a protocol for digital communications, an INVITE message from a remote handset located at second customer premises that differs from the first customer premises,
   verify, based on receiving the INVITE message, that the remote handset is associated with the first customer premises, establish, based on receiving the INVITE message and based on verifying that the remote handset is associated with the first customer premises, a digital session between the remote handset and the telephone base unit via the packet switched network, parse the INVITE message to identify a telephone number associated with the INVITE message, the telephone number being associated with a telephone device that is associated with a first location and coupled to the circuit switched network, send a set of signals, based on the INVITE message, to the circuit switched network to establish, based on the telephone number and via the circuit switched network according to a protocol for analog communications, an analog session between the telephone device and the telephone base unit, and bridge the digital session and the analog session to enable communications between the remote handset and the telephone device, the communications occurring as if the remote handset is located at the first customer premises.

2. The system of claim 1, further comprising:
a router at the first customer premises to enable selective communication between the telephone base unit and the remote handset via the packet switched network.

3. The system of claim 2, where the packet switched network is a wide-area network, and
where an interface further comprises a local area network to selectively transport digital communications between the router and the telephone base unit.

4. The system of claim 1, where the protocol for digital communications includes at least one of:
session initiation protocol (SIP), or
voice over internet protocol (VoIP).

5. The system of claim 1, where the protocol for analog communications includes signaling system seven.

6. The system of claim 1, where the interface includes an analog network coupling the circuit switched network and the telephone base unit.

7. The system of claim 1, further comprising:
an RJ11 interface that couples the telephone base unit to the circuit switched network; and
an RJ45 interface that couples the telephone base unit to the first customer premises.

8. A method, comprising:
receiving, by a communications device associated with a first customer premises and through a first interface coupled to a wide area network, a message from a remote handset,
the message being formatted according to a protocol for digital communications,
the message indicating that a user of the remote handset has dialed a telephone number, and
the remote handset connecting to the wide area network at a second customer premises that differs from the first customer premises;
verifying, by the communications device and based on receiving the message, that the remote handset is associated with the first customer premises;
parsing, by the communications device, the message, to identify the telephone number; and
establishing, by the communications device and based on verifying that the remote handset is associated with the first customer premises, a call between the remote handset and a telephone device associated with the telephone number,
the call occurring as if the remote handset is located at the first customer premises, and
wherein establishing the call comprises:
providing, through a second interface, a first signal based on the parsed message to a central office through an interface between a packet switched network and the central office according to a protocol for analog communications,
the first signal indicating that the call is to be placed,
receiving, through the second interface, a second signal from the central office,
the second signal indicating that the central office is ready to receive the telephone number,
providing, through the second interface, the telephone number to the central office according to the protocol for analog communications,
receiving, through the second interface, a third signal from the central office,
the third signal indicating that the telephone device corresponding to the telephone number is ringing,
receiving, through the second interface, a fourth signal from the central office,
where the fourth signal indicates that the telephone device has answered the call, and
providing, through the first interface, a fifth signal to the remote handset,
where the fifth signal indicates that the telephone device has answered the call.

9. The method of claim 8, where the communications device is associated with a particular network address, and
where the message is addressed to the particular network address.

10. The method of claim 8, further comprising:
using both the protocol for digital communications and the protocol for analog communications to establish the call between the remote handset and the telephone device corresponding with the telephone device accessible through a public switched telephone network.

11. The method of claim 8, further comprising:
receiving the message from the remote handset through a router that connects the communications device to the wide area network.

12. The method of claim 8, where the central office is to connect telephone units to a public switched telephone network.

13. The method of claim 8, where establishing the call further comprises:
after providing the fifth signal to the remote handset, establishing a media path between the remote handset and the central office.

14. The method of claim 13, further comprising:
receiving a sixth signal from the remote handset according to the protocol for digital communications,
where the sixth signal indicates that the call has ended, and
providing a seventh signal to the central office according to the protocol for analog communications,
where the seventh signal indicates that the call has ended.

15. The method of claim 14, where the seventh signal is an "on hook" signal.

16. The method of claim 14, where the sixth signal is a Session Initiation Protocol (SIP) BYE message.

17. The method of claim 8, where the communications device is communicatively coupled to the remote handset and the central office.

18. An apparatus, comprising:
a first interface that includes a packet switched network connector mechanism,
where the first interface is to:
receive a message from a remote handset through a packet switched network according to a protocol for digital communications,
the message indicating that a user has dialed a number at the remote handset,
the apparatus being located at a first location and the remote handset being located at a second location that differs from the first location, and
the apparatus being coupled to the remote handset via a wide area network;
logic to:
verify that the remote handset is associated with the first location, and
parse the message to determine the dialed number; and
a second interface that includes a public switched telephone network connector mechanism,
where the second interface is to:
send a set of signals based on the message to a central office
according to a protocol for analog communications,
at least one of the sent signals being associated with the dialed number, and
the logic being further to enable, based on verifying that the remote handset is associated with the first location, communications to be established between the remote handset and a telephone device associated with the dialed number,
the communications occurring as if the remote handset is located at the first location.

19. The apparatus of claim 8, where the first interface includes an RJ45 connector, and where the second interface includes an RJ11 connector.

20. A method, comprising:
receiving, at a telephone base unit that is communicatively coupled to a wide-area packet switched network and a central office of a public switched telephone network, a Session Initiation Protocol (SIP) INVITE message from a remote handset,
the telephone base unit being located at a first location and the remote handset being located at a second location that differs from the first location;
parsing, by the telephone base unit, the SIP INVITE message to determine a telephone number of a dialed party;
verifying, based on receiving the SIP INVITE message, that the remote handset is associated with the first location;
providing, by the telephone base unit, a signal, based on parsing the SIP INVITE message and based on verifying that the remote handset is associated with the first location, to the central office through an interface between the packet switched network and the central office according to a protocol for analog communications,
the signal indicating that a call is to be initiated;
upon providing the signal to the central office, receiving, by the telephone base unit, a dial tone from the central office;
after receiving the dial tone from the central office, providing, by the telephone base unit, a message to the remote handset indicating that the dial tone has been received from the central office;
after receiving the dial tone from the central office, providing, by the telephone base unit, the telephone number to the central office;
establishing by the telephone base unit, a media path between the remote handset and the central office upon providing the telephone number to the central office,
the media path enabling communications between the remote handset and the dialed party to occur as if the remote handset is located at the first location.

\* \* \* \* \*